US012573236B2

(12) United States Patent
Shu et al.

(10) Patent No.: US 12,573,236 B2
(45) Date of Patent: Mar. 10, 2026

(54) FACIAL EXPRESSION-BASED DETECTION METHOD FOR DEEPFAKE BY GENERATIVE ARTIFICIAL INTELLIGENCE (AI)

(71) Applicants: Shandong Artificial Intelligence Institute, Jinan (CN); Qilu University of Technology (Shandong Academy of Sciences), Jinan (CN)

(72) Inventors: Minglei Shu, Jinan (CN); Zhenyu Liu, Jinan (CN); Ruixia Liu, Jinan (CN); Chao Chen, Jinan (CN); Ke Shan, Jinan (CN); Zhaoyang Liu, Jinan (CN); Shuwang Zhou, Jinan (CN); Pengyao Xu, Jinan (CN); Tianlei Gao, Jinan (CN)

(73) Assignees: SHANDONG ARTIFICIAL INTELLIGENCE INSTITUTE, Jinan (CN); QILU UNIVERSITY OF TECHNOLOGY (SHANDONG ACADEMY OF SCIENCES), Jinan (CN)

( * ) Notice: Subject to any disclaimer, the term of this patent is extended or adjusted under 35 U.S.C. 154(b) by 280 days.

(21) Appl. No.: 18/590,975

(22) Filed: Feb. 29, 2024

(65) Prior Publication Data
US 2024/0378921 A1 Nov. 14, 2024

(30) Foreign Application Priority Data
May 11, 2023 (CN) .......................... 202310524491.9

(51) Int. Cl.
*G06V 40/16* (2022.01)
(52) U.S. Cl.
CPC .......... *G06V 40/174* (2022.01); *G06V 40/172* (2022.01)

(58) Field of Classification Search
CPC .... G06V 40/174; G06V 40/172; G06V 10/82; G06V 10/7715; G06V 10/774;
(Continued)

(56) References Cited
U.S. PATENT DOCUMENTS 11,837,021 B1 * 12/2023 Yu ........................ G06V 10/806
2021/0209388 A1 * 7/2021 Ciftci ..................... G06N 3/045

FOREIGN PATENT DOCUMENTS

CN       111191598 A       5/2020
CN       115578770 A   *   1/2023   .......... G06V 40/174
CN       115937937 A       4/2023

OTHER PUBLICATIONS

Facial Expression Recognition Based on Visual Transformers and Local Attention Features Network (Year: 2022).*
(Continued)

*Primary Examiner* — Jennifer Mehmood
*Assistant Examiner* — Pardis Sohraby
(74) *Attorney, Agent, or Firm* — Bayramoglu Law Offices LLC

(57) ABSTRACT

A facial expression-based detection method for deepfake by generative artificial intelligence (AI) constructs an AIR-Face facial dataset for generative AI-created face detection training, and uses an untrained information feature space for real and fake classification. Nearest linear detection is performed in this space to significantly improve the generalization ability of detecting fake images, especially those created by new methods such as diffusion models or autoregressive models. The detection method improves the performance of extracting features of generative AI-created faces through phased trainings, and detects generative AI-created faces through the feature space. Compared with other methods, the detection method scientifically and effectively improves the accuracy of generative AI-created face recognition, and fully mines the potential semantic information of generative
(Continued)

Test facial image

AI-created faces through phased trainings. In this way, the detection method improves reliability and accuracy in generative AI-created face detection, meeting the needs of generative AI-created face detection.

8 Claims, 1 Drawing Sheet

(58) Field of Classification Search
CPC .... G06V 40/168; G06N 3/0464; G06N 3/047; G06N 3/048; G06N 3/08; Y02D 10/00
USPC ........................................................ 382/118
See application file for complete search history.

(56) References Cited

OTHER PUBLICATIONS

Shuang Zhao, et al., Facial Expression Recognition Based on Visual Transformers and Local Attention Features Network, The 7th International Conference on Computer and Communication Systems, 2022, pp. 228-231.

* cited by examiner

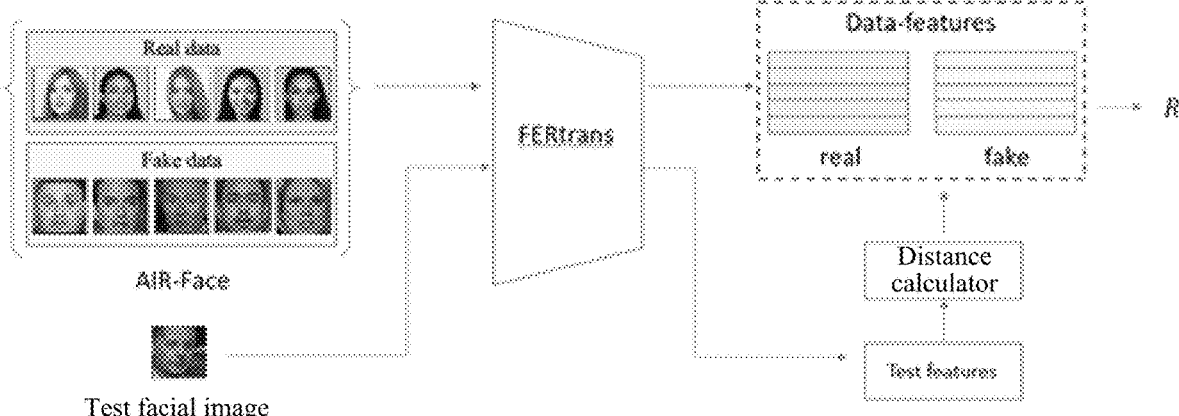
AIR-Face
Test facial image

FACIAL EXPRESSION-BASED DETECTION METHOD FOR DEEPFAKE BY GENERATIVE ARTIFICIAL INTELLIGENCE (AI)

CROSS REFERENCE TO THE RELATED APPLICATIONS

This application is based upon and claims priority to Chinese Patent Application No. 202310524491.9, filed on May 11, 2023, the entire contents of which are incorporated herein by reference.

TECHNICAL FIELD

The present disclosure relates to the technical field of face detection, and in particular to a facial expression-based detection method for deepfake by generative artificial intelligence (AI).

BACKGROUND

With the popularization of generative artificial intelligence (AI) services, technology based on large-scale pre-trained models has become an important branch of modern AI, and its excellent knowledge performance, smooth interaction, and media output are favored by users. However, facial images created by big data and big models have also brought tremendous impacts to scientific research, life, and ethics. Traditional detection methods for deepfake by generative AI usually use feature extraction-based algorithms (such as Haar cascade classifiers), which require manual design of processing flow and annotation and training of a large amount of image data, resulting in poor real-time performance and detection accuracy. Furthermore, in these traditional methods, the detection accuracy can also be affected by factors such as facial posture, angle, occlusion, and lighting.

SUMMARY

In order to overcome the above shortcomings of the prior art, the present disclosure provides a reliable and accurate facial expression-based detection method for deepfake by generative artificial intelligence (AI).

In order to solve the technical problem, the present disclosure adopts the following technical solution.

A facial expression-based detection method for deepfake by generative AI includes the following steps:

a) preprocessing facial data in a real-world affective faces database (RAF-DB) dataset to acquire a preprocessed facial expression image $P_{FER}$;

b) constructing an expression classification model, where the expression classification model includes a FERtrans model and an expression classifier; and inputting the facial expression image $P_{FER}$ into the FERtrans model to acquire an encoded feature $V_{trans}$;

c) inputting the encoded feature $V_{trans}$ into the expression classifier to acquire an expression classification result $O_{FER}$;

d) iterating, by an adaptive moment estimation (Adam) optimizer, the expression classification model through a Kullback-Leibler (KL) divergence to acquire a trained expression classification model;

e) constructing an AIR-Face facial dataset including fake and real labels;

f) inputting a facial image from the AIR-Face facial dataset into the FERtrans model of the trained expression classification model to acquire a trained encoded feature $V'_{trans}$; and storing the trained encoded feature $V'_{trans}$ of each facial image in a feature library Data-features according to a fake or real label corresponding to the facial image; and g) inputting a test facial image into the FERtrans model of the trained expression classification model to acquire a test position encoded feature $V_{trans}^{test}$; inputting the test position encoded feature $V_{trans}^{test}$ into a linear layer to acquire a vector $E_{test}$; calculating, by a cosine function, a distance between the vector $E_{test}$ and each encoded feature $V'_{trans}$ in the feature library Data-features; and taking a label corresponding to an encoded feature $V'_{trans}$ with a minimum distance as a classification result R of the test facial image.

Further, step a) includes: performing face detection on the facial data in the RAF-DB dataset through a deformable part model (DPM) algorithm to acquire a facial image; and aligning and cropping the facial image through a practical facial landmark detector (PFLD) algorithm to acquire the preprocessed facial expression image $P_{FER}$.

Further, step b) includes:

b-1) forming the FERtrans model, including an image segmentation layer, a linear embedding layer, a position encoding layer, and a FER-former encoder;

b-2) inputting the facial expression image $P_{FER}$ into the image segmentation layer of the FERtrans model to acquire m 16×16 image blocks that form an image block sequence $P_{FER}^{P}=[P_{FER}^{1}, P_{FER}^{2}, \ldots, P_{FER}^{i}, \ldots, P_{FER}^{m}]$, where $P_{FER}^{i}$ denotes an i-th image block, $i \in \{1, \ldots, m\}$;

b-3) forming the linear embedding layer of the FERtrans model, including a linear layer, a bias vector, and a weight matrix; inputting the image block sequence $P_{FER}^{P}$ into the linear layer to acquire a dimensionality-transformed image block sequence $P_{FER}^{P'}$; adding a product of the dimensionality-transformed image block sequence $P_{FER}^{P'}$ and the bias vector to the weight matrix to acquire a dimensionality-reduced embedded vector sequence $P_{FER}^{v}$;

b-4) inputting the dimensionality-reduced embedded vector sequence $P_{FER}^{v}$ into the position encoding layer of the FERtrans model; and adding a position code with a same shape as the dimensionality-reduced embedded vector sequence $P_{FER}^{v}$ to the dimensionality-reduced embedded vector sequence $P_{FER}^{v}$ through an element-wise addition method to acquire a position embedded vector sequence $P_{FER}^{pos}$;

b-5) forming the FER-former encoder of the FERtrans model, including a convolutional module, a patch embedding module, and a transformation module;

b-6) forming the convolutional module of the FER-former encoder, sequentially including a first convolutional layer, a first batch standardization layer, a first rectified linear unit (ReLU) activation function layer, a second convolutional layer, a second batch standardization layer, and a second ReLU activation function layer; and inputting the position embedded vector sequence $P_{FER}^{pos}$ into the convolutional module to acquire a vector sequence $P_{FER}^{seq}$;

b-7) forming the patch embedding module of the FER-former encoder, sequentially including a first convolutional layer, a first batch standardization layer, a first ReLU activation function layer, a second convolutional layer, a second batch standardization layer, and a second ReLU activation function layer; and adding a learnable categorical embedded vector at a beginning of the vector sequence $P_{FER}^{seq}$, and inputting the vector sequence into the patch embedding module to acquire a patch embedded vector sequence $P_{FER}^{emb}$; and b-8) forming the transformation module of the FER-former encoder, sequentially including a multi-head attention module, a feedforward module, and a residual connection module; forming the multi-head attention module of the transformation module, sequentially including a linear layer, a dot product attention mechanism, and a batch standardization layer; inputting the patch embedded vector sequence $P_{FER}^{emb}$ into the multi-head attention module to acquire a vector sequence $P_{FER}^{multi}$; forming the feedforward module of the transformation module, sequentially including a first linear layer, a ReLU activation function, and a second linear layer; inputting the vector sequence $P_{FER}^{multi}$ into the feedforward module to acquire a vector sequence $P_{FER}^{feed}$; and performing, by the residual connection module of the transformation module, element-wise addition between the vector sequence $P_{FER}^{feed}$ and the patch embedded vector sequence $P_{FER}^{emb}$ to acquire a residual connected encoded feature $V_{trans}$.

Preferably, in step b-2), m is 196; in step b-3), the bias vector has a size of 1×768, and the weight matrix has a size of (196×196×3)×768; in step b-4), the position code has a size of 196×768×3; in step b-6), in the convolutional module of the FER-former encoder, the first convolutional layer includes a convolution kernel with a size of 3×3 and a stride of 2, while the second convolutional layer includes a convolution kernel with a size of 9×9 and a stride of 1; and in step b-7), in the patch embedding module of the FER-former encoder, the first convolutional layer includes a convolution kernel with a size of 3×3 and a stride of 2, while the second convolutional layer includes a convolutional kernel with a size of 1×1 and a stride of 1, and the learnable categorical embedded vector has a size of 1×196.

Further, the step c) includes:

c-1) forming the expression classifier, sequentially including a linear layer, a soft maximum (Softmax) function, and a max function; inputting the encoded feature $V_{trans}$ into the expression classifier to acquire a subscript $E_i$ of a maximum value, where $i \in \{1, 2, \ldots, K\}$, K being a number of sample categories; and c-2) taking a facial expression corresponding to the subscript $E_i$ of the maximum value as the expression classification result $O_{FER}$.

Further, in step c-1), a subscript $E_1$ of the maximum value represents a surprised facial expression, a subscript $E_2$ of the maximum value represents a fearful facial expression, a subscript $E_3$ of the maximum value represents a disgusted facial expression, a subscript $E_4$ of the maximum value represents a happy facial expression, a subscript $E_5$ of the maximum value represents a sad facial expression, a subscript $E_6$ of the maximum value represents an angry facial expression, and a subscript $E_7$ of the maximum value represents a neutral facial expression.

Further, the step e) includes:

e-1) performing, by a ThreadPool module, multi-threaded downloading to acquire P generative AI-created facial images from a Generated Photos platform;

e-2) assigning the P generative AI-created facial images to a category labeled as fake;

e-3) acquiring Q real facial images from a DeeperForensics-1.0 dataset;

e-4) assigning the Q real facial images to a category labeled as real; and e-5) integrating images labeled as fake and images labeled as real into a unified dataset to acquire the AIR-Face facial dataset.

Preferably, in step e-1), P is 40,000, and in step e-3), Q is 40,000.

The present disclosure has the following beneficial effects. The present disclosure effectively represents multi-scale features using the Transformer architecture to achieve expression pre-training tasks. The present disclosure constructs an AIR-Face facial dataset for generative AI-created face detection training, and uses an untrained information feature space for real and fake classification. Nearest linear detection is performed in this space to significantly improve the generalization ability of detecting fake images, especially those created by new methods such as diffusion models or autoregressive models. The method improves the performance of extracting features of generative AI-created faces through phased trainings, and detects generative AI-created faces through the feature space. Compared with other methods, the method scientifically and effectively improves the accuracy of generative AI-created face recognition, and fully mines the potential semantic information of generative AI-created faces through phased trainings. In this way, the method improves reliability and accuracy in generative AI-created face detection, meeting the needs of generative AI-created face detection.

BRIEF DESCRIPTION OF THE DRAWINGS

FIGURE is a flowchart of a facial expression-based detection method for deepfake by generative artificial intelligence (AI) of the present disclosure.

DETAILED DESCRIPTION OF THE EMBODIMENTS

The present disclosure will be described in detail below with reference to FIGURE.

A facial expression-based detection method for deepfake by generative AI includes the following steps.

a) Facial data in a real-world affective faces database (RAF-DB) dataset are preprocessed to acquire preprocessed facial expression image $P_{FER}$.

b) An expression classification model is constructed, where the expression classification model includes a FERtrans model and an expression classifier. The facial expression image $P_{FER}$ is input into the FERtrans model to acquire encoded feature $V_{trans}$.

c) The encoded feature $V_{trans}$ is input into the expression classifier to acquire expression classification result $O_{FER}$.

d) The expression classification model is iterated by an adaptive moment estimation (Adam) optimizer through a Kullback-Leibler (KL) divergence to acquire a trained expression classification model.

e) An AIR-Face facial dataset including fake and real labels is constructed.

f) A facial image from the AIR-Face facial dataset is input into the FERtrans model of the trained expression classification model to acquire trained encoded feature $V'_{trans}$. The trained encoded feature $V'_{trans}$ of each facial image is stored in a feature library Data-features according to a fake or real label corresponding to the facial image. This step ensures that the feature vector in the feature library is consistent with the category of the original image.

g) A test facial image is input into the FERtrans model of the trained expression classification model to acquire test position encoded feature $V_{trans}^{test}$. The test position encoded feature $V_{trans}^{test}$ is input into a linear layer to acquire vector $E_{test}$. A distance between the vector $E_{test}$ and each encoded feature $V'_{trans}$ in the feature library Data-features is calculated by a cosine function. A label corresponding to encoded feature $V'_{trans}$ with a minimum distance is taken as classification result R of the test facial image.

Embodiment 1

Step a) includes the following process. Face detection is performed on the facial data in the RAF-DB dataset through a deformable part model (DPM) algorithm to acquire a facial image, and the facial image is aligned and cropped through a practical facial landmark detector (PFLD) algorithm to acquire the preprocessed facial expression image $P_{FER}$.

Embodiment 2

Step b) includes the following process.

b-1) The FERtrans model is formed, including an image segmentation layer, a linear embedding layer, a position encoding layer, and a FER-former encoder.

b-2) The facial expression image $P_{FER}$ is input into the image segmentation layer of the FERtrans model to acquire m 16×16 image blocks that form image block sequence $P_{FER}^P=[P_{FER}^1, P_{FER}^2, \ldots, P_{FER}^i, \ldots, P_{FER}^m]$, where $P_{FER}^i$ denotes an i-th image block, $i \in \{1, \ldots, m\}$.

b-3) The linear embedding layer of the FERtrans model is formed, including a linear layer, a bias vector, and a weight matrix. The image block sequence $P_{FER}^P$ is input into the linear layer to acquire dimensionality-transformed image block sequence $P_{FER}^{P'}$. A product of the dimensionality-transformed image block sequence $P_{FER}^{P'}$ and the bias vector is added to the weight matrix to acquire dimensionality-reduced embedded vector sequence $P_{FER}^v$.

b-4) The dimensionality-reduced embedded vector sequence $P_{FER}^v$ is input into the position encoding layer of the FERtrans model. A position code with a same shape as the dimensionality-reduced embedded vector sequence $P_{FER}^v$ is added to the dimensionality-reduced embedded vector sequence $P_{FER}^v$ through an element-wise addition method to acquire position embedded vector sequence $P_{FER}^{pos}$.

b-5) The FER-former encoder of the FERtrans model is formed, including a convolutional module, a patch embedding module, and a transformation module.

b-6) The convolutional module of the FER-former encoder is formed, sequentially including a first convolutional layer, a first batch standardization layer, a first rectified linear unit (ReLU) activation function layer, a second convolutional layer, a second batch standardization layer, and a second ReLU activation function layer. The position embedded vector sequence $P_{FER}^{pos}$ is input into the convolutional module to acquire vector sequence $P_{FER}^{seq}$.

b-7) The patch embedding module of the FER-former encoder is formed, sequentially including a first convolutional layer, a first batch standardization layer, a first ReLU activation function layer, a second convolutional layer, a second batch standardization layer, and a second ReLU activation function layer. A learnable categorical embedded vector is added at a beginning of the vector sequence $P_{FER}^{seq}$, and the vector sequence is input into the patch embedding module to acquire patch embedded vector sequence $P_{FER}^{emb}$.

b-8) The transformation module of the FER-former encoder is formed, sequentially including a multi-head attention module, a feedforward module, and a residual connection module. The multi-head attention module of the transformation module is formed, sequentially including a linear layer, a dot product attention mechanism, and a batch standardization layer. The multi-head attention module is configured to capture a long-distance dependence in the input sequence. The patch embedded vector sequence $P_{FER}^{emb}$ is input into the multi-head attention module to acquire vector sequence $P_{FER}^{multi}$. The feedforward module of the transformation module is formed, sequentially including a first linear layer, a ReLU activation function, and a second linear layer. The vector sequence $P_{FER}^{multi}$ is input into the feedforward module to acquire vector sequence $P_{FER}^{feed}$. Element-wise addition is performed between the vector sequence $P_{FER}^{feed}$ and the patch embedded vector sequence $P_{FER}^{emb}$ by the residual connection module of the transformation module to acquire residual connected encoded feature $V_{trans}$.

Preferably, in this embodiment, in step b-2), m is 196; in step b-3), the bias vector has a size of 1×768, and the weight matrix has a size of (196×196×3)×768; the linear layer transforms the dimensionality of the image block sequence $P_{FER}^P$ into 196×196×3. in step b-4), the position code has a size of 196×768×3; in step b-6), in the convolutional module of the FER-former encoder, the first convolutional layer includes a convolution kernel with a size of 3×3 and a stride of 2, while the second convolutional layer includes a convolution kernel with a size of 9×9 and a stride of 1; and in step b-7), in the patch embedding module of the FER-former encoder, the first convolutional layer includes a convolution kernel with a size of 3×3 and a stride of 2, while the second convolutional layer includes a convolutional kernel with a size of 1×1 and a stride of 1, and the learnable categorical embedded vector has a size of 1×196.

Embodiment 3

Step c) includes the following process.

c-1) The expression classifier is formed, sequentially including a linear layer, a soft maximum (Softmax) function, and a max function. The encoded feature $V_{trans}$ is input into the expression classifier to acquire subscript $E_i$ of a maximum value, where $i \in \{1, 2, \ldots, K\}$, K being a number of sample categories.

c-2) A facial expression corresponding to the subscript $E_i$ of the maximum value is taken as expression classification result $O_{FER}$.

Further, in this embodiment, subscript $E_1$ of the maximum value represents a surprised facial expression, subscript $E_2$ of the maximum value represents a fearful facial expression, subscript $E_3$ of the maximum value represents a disgusted facial expression, subscript $E_4$ of the maximum value represents a happy facial expression, subscript $E_5$ of the maximum value represents a sad facial expression, subscript $E_6$ of the maximum value represents an angry facial expression, and subscript $E_7$ of the maximum value represents a neutral facial expression.

Embodiment 4

Step e) includes the following process.

e-1) Multi-threaded downloading is performed by a ThreadPool module to acquire P generative AI-created facial images from a Generated Photos platform. The Generated Photos platform utilizes AI technology to create high-quality fictional facial images.

e-2) The P generative AI-created facial images are assigned to a category labeled as fake. The goal of this category is to represent fictional facial images created by AI.

e-3) Q real facial images are acquired from a DeeperForensics-1.0 dataset. The DeeperForensics-1.0 dataset is a large, high-quality real-world facial image dataset used for applications such as facial recognition and fraud detection.

e-4) The Q real facial images are assigned to a category labeled as real. The goal of this category is to represent facial images in the real world.

e-5) Images labeled as fake and images labeled as real are integrated into a unified dataset to acquire the AIR-Face facial dataset.

Preferably, in this embodiment, in step e-1), P is 40,000, and in step e-3), Q is 40,000.

Finally, it should be noted that the above descriptions are only preferred embodiments of the present disclosure, and are not intended to limit the present disclosure. Although the present disclosure has been described in detail with reference to the foregoing embodiments, those skilled in the art may still modify the technical solutions described in the foregoing embodiments, or equivalently substitute some technical features thereof. Any modification, equivalent substitution, improvement, etc. within the spirit and principles of the present disclosure shall fall within the scope of protection of the present disclosure.

Taking the data from the DFEW and DFDC datasets as examples, the implementation of the present disclosure is described in detail below.

Facial images and corresponding label attributes were acquired from the DFEW and DFDC datasets, and an expression classification model and feature library Data-features were constructed. Video frames were extracted from the DFEW and the DFDC datasets for face detection, face alignment, and face cropping to acquire facial expression image $P_{FER}$ and a test facial image.

Model pretraining was performed. The facial expression image $P_{FER}$ was input into the FERtrans model to acquire encoded feature $V_{trans}$. The encoded feature $V_{trans}$ was input into the expression classifier to acquire expression classification result $O_{FER}$. Model parameters in an expression decoder and an expression encoder were iterated by an Adam optimizer through a KL divergence to acquire a trained expression classification model.

In the feature library Data-features, first, an AIR-Face facial dataset including fake labels and real labels was constructed. Then, a facial image from the AIR-Facial dataset was input into the FERtrans model of the trained expression classification model to acquire trained encoded feature $V'_{trans}$. The trained encoded feature $V'_{trans}$ of each facial image in the feature library Data-features was stored according to a fake or real label corresponding to the facial image.

Finally, the test facial image was input into the FERtrans model of the trained expression classification model to acquire encoded feature $V_{trans}^{test}$ of a test position. The test position encoded feature $V_{trans}^{test}$ was input into a linear layer to acquire vector $E_{test}$. A distance between the vector $E_{test}$ and each encoded feature $V'_{trans}$ in the feature library Data-features was calculated by a cosine function. A label corresponding to an encoded feature $V'_{trans}$ with a minimum distance was taken as classification result R of the test facial image.

To demonstrate the effectiveness the proposed method of the present disclosure, the proposed method was compared with MesoNet, MesoInception, Capsule, MAT, CviT, Xception, TwoStream, SBIs, EfficientViT, CrossEfficientViT, and RECCE, as shown in Table 1. ACC denotes a proportion of correctly predicted samples to a total number of samples, which is used to measure the accuracy of prediction results. AUC is a performance indicator used to measure the performance of the learner, indicating the authenticity of the detection methods.

In order to fully validate the effectiveness and accuracy of the proposed method, extensive intra- and cross-dataset evaluations were conducted. After all models were trained on DFDC, they were tested on FF++, DFDC, Celeb DF, DF-1.0, and DFD. For fair comparison, all models were trained and evaluated on the same dataset. As shown in Table 1, the proposed method of the present disclosure far exceeds most of the state-of-the-art methods. It exceeds the state-of-the-art method Xception, 1.7% AUC, 96.5%→98.2%. Unlike Xception, which captures local information, the proposed method can study richer local and global features, thereby detecting traces of various forged faces. Compared with the transformer-based model CViT that considers both local and global knowledge, the proposed method demonstrates the value of studying rich local features and convolutional enhanced global representations. Especially for the DF-1.0 dataset, it is a challenging benchmark as it utilizes a wide range of real-world perturbations to achieve a large scale and higher diversity. The accuracy of the proposed method is approximately 12.6%, 19.3%, 11.8%, and 7.3% higher than that of MAT, CViT, Two Stream, and Xception, respectively, showing significant performance of the proposed method on DF-1.0. All these results indicate that the proposed method is more accurate than the above state-of-the-art methods.

TABLE 1

| | FF++ | | Celeb-DF | | DFDC | | DF-1.0 | | DFD | |
|---|---|---|---|---|---|---|---|---|---|---|
| | Model comparison results | | | | | | | | | |
| Method | ACC | AUC | ACC | AUC | ACC | AUC | ACC | AUC | ACC | AUC |
| MesoNet | 50.62 | 51.60 | 59.26 | 49.72 | 49.34 | 47.27 | 49.73 | 47.32 | 47.65 | 47.53 |
| MesoInception | 55.35 | 56.72 | 53.44 | 52.62 | 51.59 | 54.29 | 52.62 | 50.76 | 52.93 | 56.82 |

TABLE 1-continued

| | | Model comparison results | | | | | | | | |
|---|---|---|---|---|---|---|---|---|---|---|
| | FF++ | | Celeb-DF | | DFDC | | DF-1.0 | | DFD | |
| Method | ACC | AUC | ACC | AUC | ACC | AUC | ACC | AUC | ACC | AUC |
| Capsule | 81.67 | 88.08 | 60.17 | 58.97 | 64.70 | 68.15 | 65.40 | 70.57 | 76.67 | 82.92 |
| MAT | 87.50 | 94.85 | 44.78 | 57.20 | 63.16 | 69.56 | 56.90 | 61.72 | 77.63 | 85.18 |
| CViT | 90.47 | 96.69 | 50.75 | 64.70 | 60.95 | 65.96 | 56.15 | 51.42 | 77.70 | 89.28 |
| Xception | 90.08 | 96.51 | 54.24 | 65.86 | 58.77 | 66.95 | 54.76 | 67.03 | 76.84 | 85.20 |
| TwoStream | 88.17 | 94.93 | 52.95 | 60.90 | 59.93 | 64.80 | 55.83 | 62.54 | 75.77 | 83.79 |
| SBIs | 80.48 | 97.82 | 54.67 | 60.61 | 66.00 | 72.73 | 52.30 | 52.18 | 80.93 | 90.20 |
| EfficientViT | 86.26 | 94.14 | 45.00 | 58.47 | 60.78 | 66.12 | 62.67 | 66.60 | 76.75 | 86.50 |
| CrossEfficient ViT | 92.69 | 98.08 | 45.97 | 63.37 | 62.64 | 70.13 | 61.18 | 65.30 | 81.71 | 90.23 |
| RECCE | 92.72 | 98.13 | 46.63 | 63.52 | 61.66 | 69.28 | 58.61 | 58.73 | 76.07 | 88.59 |
| Ours | 93.21 | 98.20 | 60.23 | 66.22 | 67.88 | 73.67 | 65.45 | 74.36 | 82.93 | 90.58 |

What is claimed is:

1. A facial expression-based detection method for deepfake by generative artificial intelligence (AI), comprising the following steps:

a) preprocessing facial data in a real-world affective faces database (RAF-DB) dataset to acquire a preprocessed facial expression image $P_{FER}$;

b) constructing an expression classification model, wherein the expression classification model includes a FERtrans model and an expression classifier; and inputting the facial expression image $P_{FER}$ into the FERtrans model to acquire an encoded feature $V_{trans}$;

c) inputting the encoded feature $V_{trans}$ into the expression classifier to acquire an expression classification result $O_{FER}$;

d) iterating, by an adaptive moment estimation (Adam) optimizer, the expression classification model through a Kullback-Leibler (KL) divergence to acquire a trained expression classification model;

e) constructing an AIR-Face facial dataset comprising fake and real labels;

f) inputting a facial image from the AIR-Face facial dataset into the FERtrans model of the trained expression classification model to acquire a trained encoded feature $V'_{trans}$; and storing the trained encoded feature $V'_{trans}$ of each facial image in a feature library Data-features according to a fake or real label corresponding to the facial image; and g) inputting a test facial image into the FERtrans model of the trained expression classification model to acquire a test position encoded feature $V_{trans}^{test}$; inputting the test position encoded feature $V_{trans}^{test}$ into a linear layer to acquire a vector $E_{test}$; calculating, by a cosine function, a distance between the vector $E_{test}$ and each encoded feature $V'_{trans}$ in the feature library Data-features; and taking a label corresponding to an encoded feature $V'_{trans}$ with a minimum distance as a classification result R of the test facial image.

2. The facial expression-based detection method for deepfake by generative AI according to claim 1, wherein step a) comprises: performing face detection on the facial data in the RAF-DB dataset through a deformable part model (DPM) algorithm to acquire a facial image; and aligning and cropping the facial image through a practical facial landmark detector (PFLD) algorithm to acquire the preprocessed facial expression image $P_{FER}$.

3. The facial expression-based detection method for deepfake by generative AI according to claim 1, wherein step b) comprises:

b-1) forming the FERtrans model, comprising an image segmentation layer, a linear embedding layer, a position encoding layer, and a FER-former encoder;

b-2) inputting the facial expression image $P_{FER}$ into the image segmentation layer of the FERtrans model to acquire m 16×16 image blocks that form an image block sequence $P_{FER}^{P}=[P_{FER}^{1}, P_{FER}^{2}, \ldots, P_{FER}^{i}, \ldots, P_{FER}^{m}]$, wherein $P_{FER}^{i}$ denotes an i-th image block, $i \in \{1, \ldots, m\}$;

b-3) forming the linear embedding layer of the FERtrans model, comprising a linear layer, a bias vector, and a weight matrix; inputting the image block sequence $P_{FER}^{P}$ into the linear layer to acquire a dimensionality-transformed image block sequence $P_{FER}^{P'}$; adding a product of the dimensionality-transformed image block sequence $P_{FER}^{P'}$ and the bias vector to the weight matrix to acquire a dimensionality-reduced embedded vector sequence $P_{FER}^{v}$;

b-4) inputting the dimensionality-reduced embedded vector sequence $P_{FER}^{v}$ into the position encoding layer of the FERtrans model; and adding a position code with a same shape as the dimensionality-reduced embedded vector sequence $P_{FER}^{v}$ to the dimensionality-reduced embedded vector sequence $P_{FER}^{v}$ through an element-wise addition method to acquire a position embedded vector sequence $P_{FER}^{pos}$;

b-5) forming the FER-former encoder of the FERtrans model, comprising a convolutional module, a patch embedding module, and a transformation module;

b-6) forming the convolutional module of the FER-former encoder, sequentially comprising a first convolutional layer, a first batch standardization layer, a first rectified linear unit (ReLU) activation function layer, a second convolutional layer, a second batch standardization layer, and a second ReLU activation function layer; and inputting the position embedded vector sequence $P_{FER}^{pos}$ into the convolutional module to acquire a vector sequence $P_{FER}^{seq}$;

b-7) forming the patch embedding module of the FER-former encoder, sequentially comprising a first convolutional layer, a first batch standardization layer, a first ReLU activation function layer, a second convolutional layer, a second batch standardization layer, and a second ReLU activation function layer; and adding a learnable categorical embedded vector at a beginning of the vector sequence $P_{FER}^{seq}$, and inputting the vector sequence into the patch embedding module to acquire a patch embedded vector sequence $P_{FER}^{emb}$; and b-8) forming the transformation module of the FER-former encoder, sequentially comprising a multi-head attention module, a feedforward module, and a residual connection module; forming the multi-head attention module of the transformation module, sequentially comprising a linear layer, a dot product attention mechanism, and a batch standardization layer; inputting the patch embedded vector sequence $P_{FER}^{emb}$ into the multi-head attention module to acquire a vector sequence $P_{FER}^{multi}$; forming the feedforward module of the transformation module, sequentially comprising a first linear layer, a ReLU activation function, and a second linear layer; inputting the vector sequence $P_{FER}^{multi}$ into the feedforward module to acquire a vector sequence $P_{FER}^{feed}$; and performing, by the residual connection module of the transformation module, element-wise addition between the vector sequence $P_{FER}^{feed}$ and the patch embedded vector sequence $P_{FER}^{emb}$ to acquire a residual connected encoded feature $V_{trans}$.

4. The facial expression-based detection method for deepfake by generative AI according to claim 3, wherein in step b-2), m is 196; in step b-3), the bias vector has a size of 1×768, and the weight matrix has a size of (196×196×3)× 768; in step b-4), the position code has a size of 196×768×3; in step b-6), in the convolutional module of the FER-former encoder, the first convolutional layer comprises a convolution kernel with a size of 3×3 and a stride of 2, while the second convolutional layer comprises a convolution kernel with a size of 9×9 and a stride of 1; and in step b-7), in the patch embedding module of the FER-former encoder, the first convolutional layer comprises a convolution kernel with a size of 3×3 and a stride of 2, while the second convolutional layer comprises a convolutional kernel with a size of 1×1 and a stride of 1, and the learnable categorical embedded vector has a size of 1×196.

5. The facial expression-based detection method for deepfake by generative AI according to claim 1, wherein step c) comprises:

c-1) forming the expression classifier, sequentially comprising a linear layer, a soft maximum (Softmax) function, and a max function; inputting the encoded feature $V_{trans}$ into the expression classifier to acquire a subscript $E_i$ of a maximum value, wherein $i \in \{1, 2, \ldots, K\}$, K being a number of sample categories; and c-2) taking a facial expression corresponding to the subscript $E_i$ of the maximum value as the expression classification result $O_{FER}$.

6. The facial expression-based detection method for deepfake by generative AI according to claim 5, wherein in step c-1), a subscript $E_1$ of the maximum value represents a surprised facial expression, a subscript $E_2$ of the maximum value represents a fearful facial expression, a subscript $E_3$ of the maximum value represents a disgusted facial expression, a subscript $E_4$ of the maximum value represents a happy facial expression, a subscript $E_5$ of the maximum value represents a sad facial expression, a subscript $E_6$ of the maximum value represents an angry facial expression, and a subscript $E_7$ of the maximum value represents a neutral facial expression.

7. The facial expression-based detection method for deepfake by generative AI according to claim 1, wherein step e) comprises:

e-1) performing, by a ThreadPool module, multi-threaded downloading to acquire P generative AI-created facial images from a Generated Photos platform;

e-2) assigning the P generative AI-created facial images to a category labeled as fake;

e-3) acquiring Q real facial images from a DeeperForensics-1.0 dataset;

e-4) assigning the Q real facial images to a category labeled as real; and e-5) integrating images labeled as fake and images labeled as real into a unified dataset to acquire the AIR-Face facial dataset.

8. The facial expression-based detection method for deepfake by generative AI according to claim 7, wherein in step e-1), P is 40,000, and in step e-3), Q is 40,000.

* * * * *